US009053337B2

(12) United States Patent
Carrara et al.

(10) Patent No.: US 9,053,337 B2
(45) Date of Patent: Jun. 9, 2015

(54) METHODS AND DEVICES FOR CONTROLLING ACCESS TO A COMPUTING RESOURCE BY APPLICATIONS EXECUTABLE ON A COMPUTING DEVICE

(75) Inventors: Michael Anthony Carrara, Ottawa (CA); Dinah Lea Marie Davis, Waterloo (CA); Neil Patrick Adams, Kitchener (CA)

(73) Assignee: BlackBerry Limited, Waterloo, Ontario (CA)

( * ) Notice: Subject to any disclaimer, the term of this patent is extended or adjusted under 35 U.S.C. 154(b) by 127 days.

(21) Appl. No.: 13/155,181

(22) Filed: Jun. 7, 2011

(65) Prior Publication Data

US 2012/0317609 A1  Dec. 13, 2012

(51) Int. Cl.
*G06F 21/50* (2013.01)
*G06F 21/62* (2013.01)
*G06F 21/12* (2013.01)

(52) U.S. Cl.
CPC .......... *G06F 21/6218* (2013.01); *G06F 21/121* (2013.01); *G06F 2221/2141* (2013.01)

(58) Field of Classification Search
CPC ............ H04L 12/2424; H04L 12/2642; H04L 67/125; G06F 21/00; G06F 21/121; G06F 21/128; G06F 2221/2141; G06F 21/6218
USPC ...................................... 726/1, 2, 4
See application file for complete search history.

(56) References Cited

U.S. PATENT DOCUMENTS

| 7,096,491 | B2 | 8/2006 | Cheng |
| 7,174,534 | B2 | 2/2007 | Chong et al. |
| 7,614,078 | B1 | 11/2009 | Stieglitz |
| 7,647,036 | B2 | 1/2010 | Omae et al. |
| 8,255,991 | B1 | 8/2012 | Hackborn et al. |
| 8,265,595 | B1 | 9/2012 | Reeves et al. |

(Continued)

FOREIGN PATENT DOCUMENTS

| EP | 1465039 A1 | 10/2004 |
| EP | 1564957 B1 | 8/2005 |

(Continued)

OTHER PUBLICATIONS

Co-pending U.S. Appl. No. 13/155,116, "Method and Devices for Managing Permission Requests to Allow Access to a Computing Resource", filed Jun. 7, 2011.

(Continued)

*Primary Examiner* — Ellen Tran
(74) *Attorney, Agent, or Firm* — Integral Intellectual Property Inc.; Miriam Paton; Amy Scouten (57) ABSTRACT

Methods and devices for controlling access to a computing resource by applications executable on a computing device are described herein. In one example embodiment, method comprises: identifying an application category with which one or more applications executable on the computing device is associated; providing one or more rules that specify whether the one or more applications associated with the application category are permitted to access the computing resource on the computing device; and transmitting the security policy to the computing device; wherein when the security policy is enforced at the computing device, access to the computing resource by the one or more applications executable on the computing device that are associated with the application category is controlled by the one or more rules.

19 Claims, 7 Drawing Sheets

(56) References Cited

U.S. PATENT DOCUMENTS

| | | | |
|---|---|---|---|
| 8,272,030 B1* | 9/2012 | Annan et al. ............... | 726/1 |
| 8,281,410 B1 | 10/2012 | Sobel et al. | |
| 8,406,734 B2 | 3/2013 | Otaka et al. | |
| 8,650,550 B2 | 2/2014 | Carrara et al. | |
| 8,763,080 B2 | 6/2014 | Carrara et al. | |
| 8,844,026 B2 | 9/2014 | Truskovsky et al. | |
| 8,849,957 B1 | 9/2014 | Boodman et al. | |
| 8,990,795 B2 | 3/2015 | Brunsman et al. | |
| 2003/0051169 A1 | 3/2003 | Sprigg et al. | |
| 2004/0088563 A1 | 5/2004 | Hogan et al. | |
| 2004/0148514 A1 | 7/2004 | Fee et al. | |
| 2004/0204073 A1 | 10/2004 | Yanosy | |
| 2005/0075101 A1 | 4/2005 | Tsuda | |
| 2005/0124332 A1 | 6/2005 | Clark et al. | |
| 2005/0210035 A1* | 9/2005 | Kester et al. ............. | 707/10 |
| 2005/0213763 A1 | 9/2005 | Owen et al. | |
| 2005/0289348 A1 | 12/2005 | Joy et al. | |
| 2006/0026667 A1 | 2/2006 | Bhide et al. | |
| 2006/0090192 A1 | 4/2006 | Corby et al. | |
| 2007/0150617 A1 | 6/2007 | Hariki | |
| 2007/0192839 A1 | 8/2007 | Fee et al. | |
| 2008/0014912 A1 | 1/2008 | Otaka et al. | |
| 2008/0052383 A1 | 2/2008 | O'Shaughnessy et al. | |
| 2009/0172657 A1 | 7/2009 | Makelainen et al. | |
| 2009/0199296 A1 | 8/2009 | Xie et al. | |
| 2009/0271844 A1 | 10/2009 | Zhang et al. | |
| 2010/0087184 A1* | 4/2010 | Stoev et al. ............. | 455/422.1 |
| 2010/0197326 A1 | 8/2010 | Ngo | |
| 2010/0242097 A1 | 9/2010 | Hotes et al. | |
| 2010/0262619 A1 | 10/2010 | Zargahi et al. | |
| 2011/0055926 A1 | 3/2011 | Bennett et al. | |
| 2011/0307831 A1 | 12/2011 | Cowan et al. | |
| 2012/0204235 A1 | 8/2012 | Jaudon et al. | |
| 2012/0209923 A1 | 8/2012 | Mathur et al. | |
| 2012/0291102 A1 | 11/2012 | Cohen | |
| 2012/0303476 A1 | 11/2012 | Krzyzanowski et al. | |
| 2012/0317565 A1 | 12/2012 | Carrara et al. | |
| 2012/0317609 A1 | 12/2012 | Carrara et al. | |
| 2012/0317638 A1 | 12/2012 | Carrara et al. | |
| 2013/0051615 A1 | 2/2013 | Lim et al. | |
| 2013/0152070 A1 | 6/2013 | Bhullar et al. | |
| 2013/0219383 A1 | 8/2013 | Hilerio et al. | |
| 2013/0326614 A1 | 12/2013 | Truskovsky et al. | |
| 2013/0339942 A1 | 12/2013 | Brunsman et al. | |
| 2014/0082661 A1 | 3/2014 | Krahnstoever et al. | |
| 2014/0109085 A1 | 4/2014 | Carrara et al. | |
| 2014/0245448 A1 | 8/2014 | Moon et al. | |
| 2014/0282371 A1 | 9/2014 | Hirsch et al. | |
| 2014/0298320 A1 | 10/2014 | Xu et al. | |

FOREIGN PATENT DOCUMENTS

| | | |
|---|---|---|
| EP | 2533150 | 12/2012 |
| EP | 2533168 | 12/2012 |
| EP | 2533170 | 12/2012 |
| GB | 2353918 A | 3/2001 |

OTHER PUBLICATIONS

Co-pending U.S. Appl. No. 13/155,217, "Methods and Devices for Controlling Access to Computing Resources", filed Jun. 7, 2011.
Extended European Search Report, European Patent Application No. EP11169193.7, dated Nov. 7, 2012.
Non-Final Office Action, Co-Pending U.S. Appl. No. 13/155,116, dated Nov. 29, 2012.
Response to Non-Final Office Action, Co-Pending U.S. Appl. No. 13/155,116, dated Feb. 28, 2013.
Intent to Grant. U.S. Appl. No. 13/155,217. Dated Dec. 11, 2013.
Request for Continued Examination (RCE). U.S. Appl. No. 13/155,217. Dated Dec. 12, 2013.
Petition to Withdraw an Application From Issue After Payment of Issue Fee. U.S. Appl. No. 13/155,217. Dated Dec. 12, 2013.
Decision on Petition. U.S. Appl. No. 13/155,217. Dated Dec. 12, 2013.
Notice of Allowance. Co-pending U.S. Appl. No. 13/155,217. Dated Aug. 30, 2013.
Examiner Initiated Interview Summary. Co-pending U.S. Appl. No. 13/155,217. Dated Aug. 22, 2013.
Applicant Interview Summary. Co-pending U.S. Appl. No. 13/155,217. Dated Sep. 4, 2013.
Response to Extended European Search Report. European Patent Application No. 11169193.7. Dated Jun. 12, 2013.
Final Office Action. Co-pending U.S. Appl. No. 13/155,116. Dated May 13, 2013.
Office Action. Co-pending U.S. Appl. No. 13/155,217. Dated Apr. 11, 2013.
Applicant Initiated Interview Summary. Co-pending U.S. Appl. No. 13/155,116. Dated Jul. 25, 2013.
Response to Final Office Action. Co-pending U.S. Appl. No. 13/155,116. Dated Jul. 31, 2013.
Response to Office Action. Co-pending U.S. Appl. No. 13/155,217. Dated Jul. 5, 2013.
Request for Continued Examination (RCE). Co-pending U.S. Appl. No. 13/155,116. Dated Jul. 31, 2013.
Office Action. Canadian Patent Application No. 2,778,572. Dated: Jun. 4, 2014.
Notice of Allowance. U.S. Appl. No. 13/155,116. Dated: Feb. 12, 2014.
Amendment After Allowance. U.S. Appl. No. 13/155,116. Dated: Apr. 28, 2014.
Response to Rule 312 Communication. U.S. Appl. No. 13/155,116. Dated: May 23, 2014.
Office Action. Canadian Patent Application No. 2,778,737. Dated: Jul. 31, 2014.
Office Action. Canadian Patent Application No. 2,778,736. Dated: Aug. 19, 2014.
Prosecution Documents for U.S. Appl. No. 13/155,116, issued to U.S. Patent No. 8,763,080 on Jun. 24, 2014.
Exam Report. European Patent Application No. 11169028.5. Dated: Nov. 11, 2014.
Prosecution Documents for U.S. Appl. No. 13/155,217, issued to U.S. Patent No. 8,650,550 on Feb. 11, 2014.
Office Action. U.S. Appl. No. 14/132,728. Dated: Nov. 19, 2014.
Response. European Patent Application No. 11169026.9. Dated: Jun. 12, 2013.
Claycomb, et al., "Towards Secure Resource Sharing for Impromptu Collaboration in Pervasive Computing", p. 7, Mar. 2007.
Gupta, et al., "Using context-profiling to aid access control decisions in mobile devices", p. 3, 2011.
Singh, "Practical Context-Aware Permission Control for Hybrid Mobile Applications", p. 21, 2013.
Wang, Notice of Allowance for U.S. Appl. No. 14/132,728, mailed Apr. 14, 2015.

* cited by examiner

METHODS AND DEVICES FOR CONTROLLING ACCESS TO A COMPUTING RESOURCE BY APPLICATIONS EXECUTABLE ON A COMPUTING DEVICE

FIELD

Embodiments described herein relate generally to controlling access to computing resources by applications executable on a computing device.

INTRODUCTION

When executing an application on a computing device, the application may access functionality provided by a computing resource on the computing device. For example, a computing resource may include a camera with which photographic operations may be performed, or a Global Positioning System (GPS) subsystem which may indicate the physical location of the computing device.

DRAWINGS

For a better understanding of the described embodiments and to show more clearly how they may be carried into effect, reference will now be made, by way of example, to the accompanying drawings in which.

DESCRIPTION OF EXAMPLE EMBODIMENTS

To prevent unauthorized access to certain computing resources on the computing device by, for example, third-party applications, administrators may be able to provide a security policy to the computing device that controls access to the computing resources. Such control may allow or deny access requests to the computing resources made by third-party applications.

One known method of controlling resources on a mobile device allows administrators to control computing resources on a per-resource basis that is applicable to all mobile devices under his control. That is, an administrator may be able to universally allow or deny access to a computing resource by all third-party applications. For example, an administrator may decide that the risk of a camera capturing sensitive, confidential information is high. As a result, the administrator may deny access to camera operations by all third-party applications. While this method may ensure maximum security, it lacks the flexibility of allowing access to the camera operations for legitimate purposes.

Another, more flexible, approach of controlling computing resources on a mobile device may allow an administrator to specify permissions to access the computing devices on a per-application basis. For example, an administrator may specify that a merchant's application may be allowed to access the GPS functionality on the mobile device, to allow the application to better determine the location of a user. While this method of specifying per-application permissions for a resource is more flexible than universally allowing or denying access to the resource, it may be burdensome for an administrator to set permissions for each individual application that may be installed on any one if its fleet of deployed mobile devices, particularly where there a large number of applications being considered.

For at least these reasons, it may be desirable to provide administrators with a method of controlling computing resources on a mobile device that provides some of the flexibility of assigning permissions to applications, but can also reduce the burden of requiring administrators to assign permissions for individual applications.

In accordance with at least one embodiment described herein, there are provided methods and devices for controlling access to a computing resource by applications executing on a computing device based on an application category that is associated with the application.

In one broad aspect, there is provided a method of controlling access to a computing resource by applications executable on a computing device, the method comprising: identifying an application category with which one or more applications executable on the computing device is associated; providing, in a security policy, one or more rules that specify whether the one or more applications associated with the application category are permitted to access the computing resource on the computing device; and transmitting the security policy to the computing device; wherein when the security policy is enforced at the computing device, access to the computing resource by the one or more applications executable on the computing device that are associated with the application category is controlled by the one or more rules.

In some embodiments, when the security policy is enforced at the computing device, access to the computing resource by the one or more applications executable on the computing device that are associated with the application category is allowed or denied, as provided by the one or more rules.

In some embodiments, the providing is performed at an administrator device.

In some embodiments, the identifying, providing, and transmitting are performed by a server device communicatively coupled to the computing device.

In some embodiments, the computing device comprises a mobile device.

In some embodiments, the application category is used by an application server as a basis for organizing applications available for purchase in an application store, and wherein for a given application executable on the computing device, the application category with which the given application is associated is determined based on a categorization of the given application in the application store.

In some embodiments, for a given application executable on the computing device, the application category with which the given application is associated is determined based on an administrator-defined categorization.

In some embodiments, the method further comprises providing, in the security policy, one or more additional rules that specify permissions to access the computing resource on the computing device on a per-application basis.

In some embodiments, the one or more additional rules that specify permissions to access the computing resource on the computing device on the per-application basis take precedence over the rules that specify whether the one or more applications associated with the application category is permitted to access the computing resource on the computing device.

In some embodiments, the method further comprises: for each of a plurality of computing devices, receiving, from each computing device, data indicating that an identified application of the one or more applications has been associated with a user-assigned application category on the computing device; and changing an association of the identified application to the user-assigned application category, if data indicating that the identified application of the one or more applications has been associated with the user-assigned application category is received from at least a threshold number of computing devices.

In another broad aspect, there is provided a server device configured to control access to a computing resource by applications executable on a computing device coupled to the server device, wherein the server device comprises a processor configured to: identify an application category with which one or more applications executable on the computing device is associated; provide, in a security policy, one or more rules that specify whether the one or more applications associated with the application category are permitted to access the computing resource on the computing device; and transmit the security policy to the computing device; wherein when the security policy is enforced at the computing device, access to the computing resource by the one or more applications executable on the computing device that are associated with the application category is controlled by the one or more rules.

In some embodiments, when the security policy is enforced at the computing device, access to the computing resource by the one or more applications executable on the computing device that are associated with the application category is allowed or denied, as provided by the one or more rules.

In some embodiments, an administrator device provides the rules that specify whether the one or more applications associated with the application category is permitted to access the computing resource on the computing device.

In some embodiments, the computing device comprises a mobile device.

In some embodiments, the application category is used by an application server as a basis for organizing applications available for purchase in an application store, and wherein for a given application executable on the computing device, the application category with which the given application is associated is determined based on a categorization of the given application in the application store.

In some embodiments, for a given application executable on the computing device, the application category with which the given application is associated is determined based on an administrator-defined categorization.

In some embodiments, the processor is further configured to provide, in the security policy, one or more additional rules that specify permissions to access the computing resource on the computing device on a per-application basis.

In some embodiments, the one or more additional rules that specify permissions to access the computing resource on the computing device on the per-application basis take precedence over the rules that specify whether the one or more applications associated with the application category is permitted to access the computing resource on the computing device.

In some embodiments, the processor is further configured to: for each of a plurality of computing devices, receive, from each computing device, data indicating that an identified application of the one or more applications has been associated with a user-assigned application category on the computing device; and change an association of the identified application to the user-assigned application category, if data indicating that the identified application of the one or more applications has been associated with the user-assigned application category is received from at least a threshold number of computing devices.

In another broad aspect, there is provided a computer-readable medium comprising instructions which, when executed by a processor of a server device, cause the processor to perform a method of controlling access to a computing resource by applications executable on a computing device, the method comprising: identifying an application category with which one or more applications executable on the computing device is associated; providing, in a security policy, one or more rules that specify whether the one or more applications associated with the application category are permitted to access the computing resource on the computing device; and transmitting the security policy to the computing device; wherein when the security policy is enforced at the computing device, access to the computing resource by the one or more applications executable on the computing device that are associated with the application category is controlled by the one or more rules.

In another broad aspect, there is provided a method of restricting access to a computing resource on a computing device, the method comprising: receiving a security policy at the computing device, the security policy providing one or more rules that specify an application category such that one or more applications executable on the computing device associated with the application category are permitted access or are denied access to the computing resource on the computing device as provided by the one or more rules; and enforcing the security policy at the computing device, wherein access to the computing resource by the one or more applications executable on the computing device that are associated with the application category is controlled by the one or more rules.

In another broad aspect, there is provided a computing device configured to restrict access to a computing resource on the computing device, wherein the computing device comprises a processor configured to: receive a security policy at the computing device, the security policy providing one or more rules that specify an application category such that one or more applications executable on the computing device associated with the application category are permitted access or are denied access to the computing resource on the computing device as provided by the one or more rules; and enforce the security policy at the computing device, wherein access to the computing resource by the one or more applications executable on the computing device that are associated with the application category is controlled by the one or more rules.

In some embodiments, the computing device comprises a mobile device.

Figure 1:
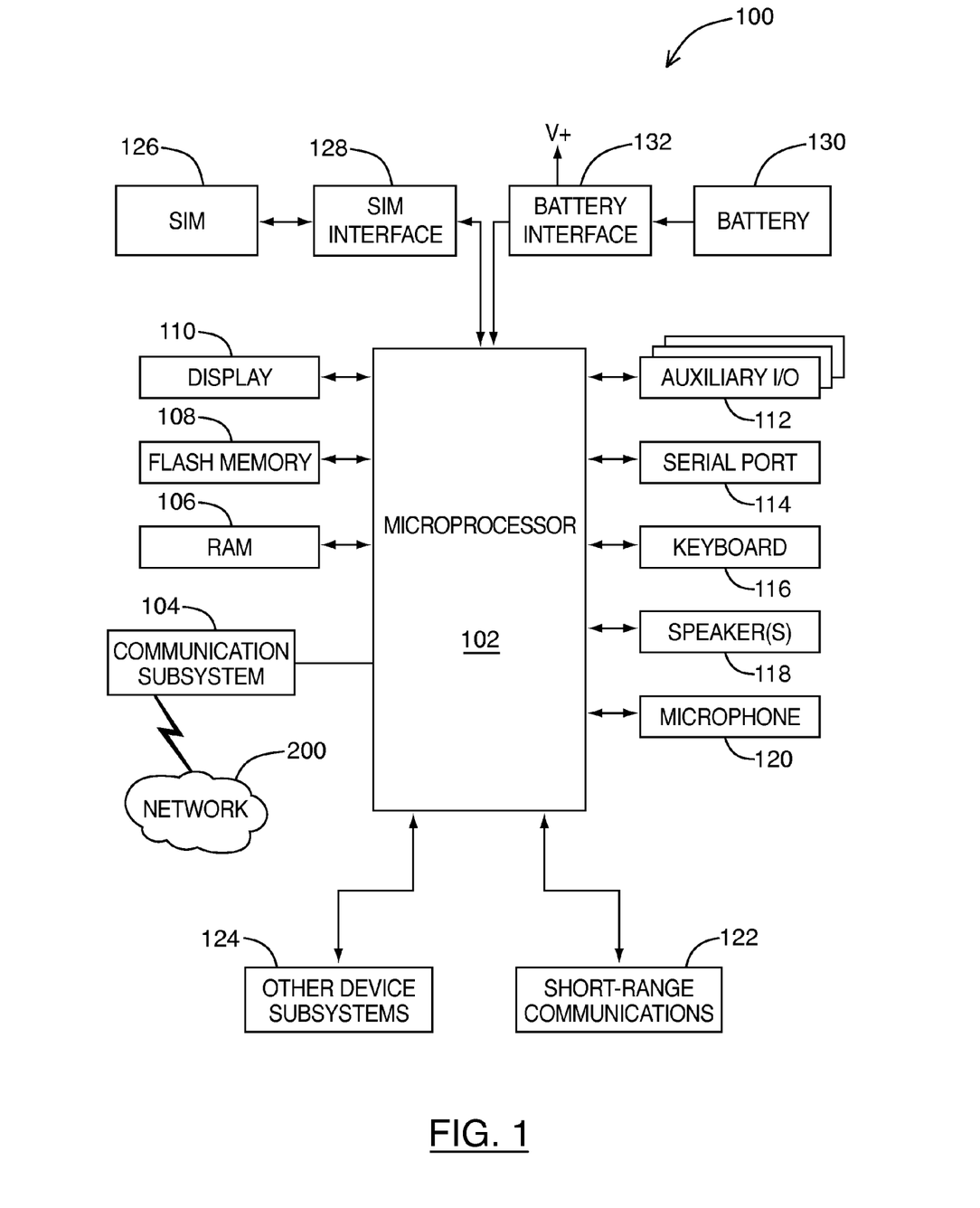
FIG. 1 is a block diagram of a mobile device in one example implementation.
Figure 2:
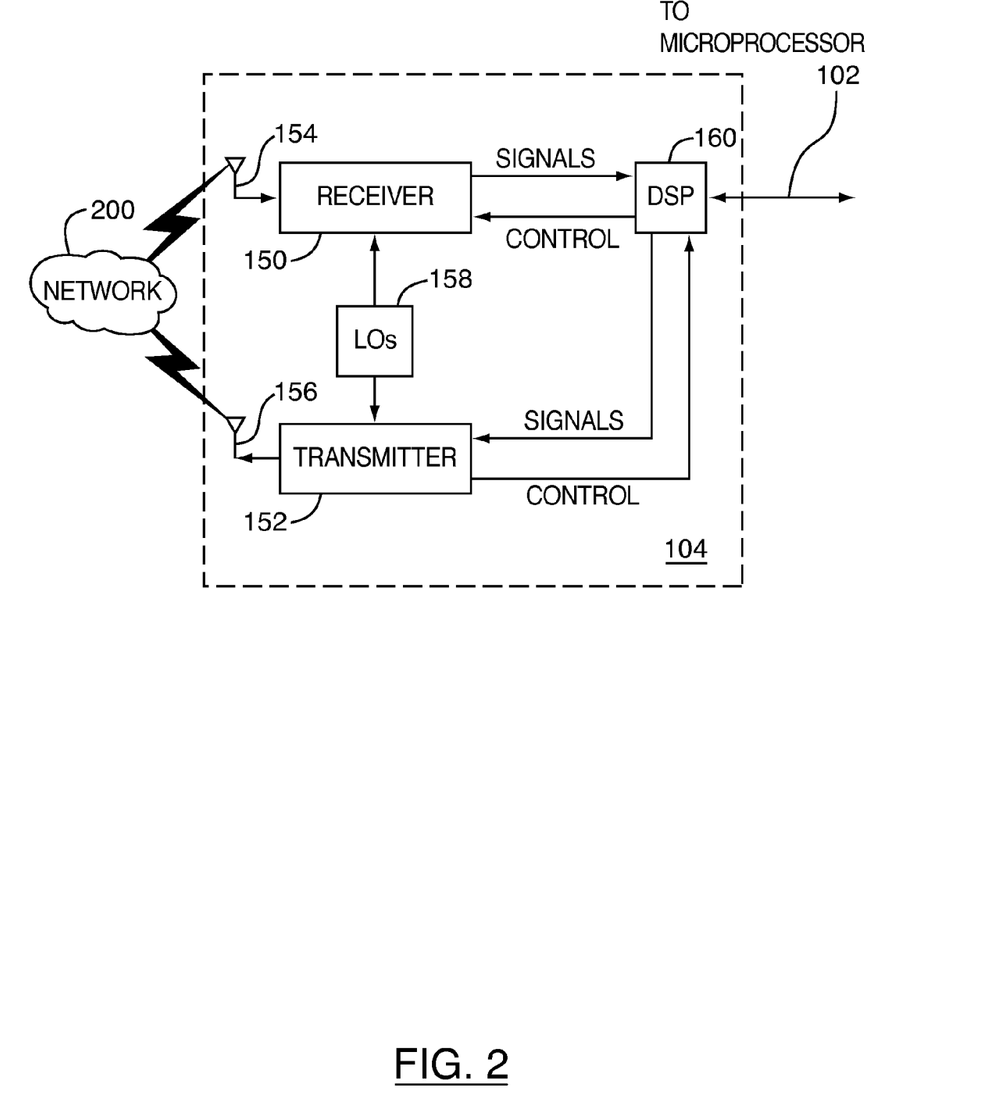
FIG. 2 is a block diagram of a communication sub-system component of the mobile device of FIG. 1.
Figure 3:
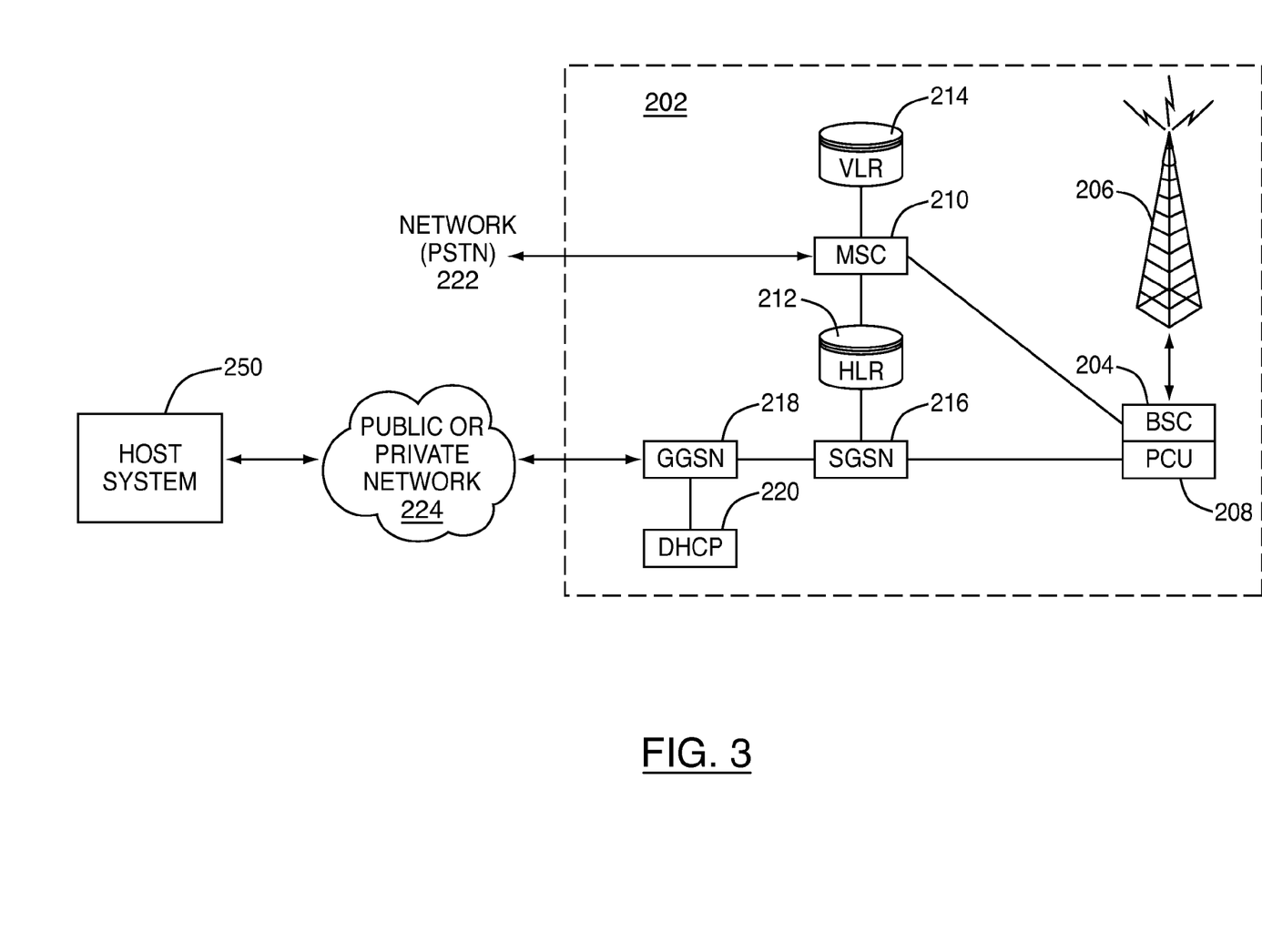
FIG. 3 is a block diagram of a node of a wireless network in one example implementation.

Reference is first made to FIGS. 1 to 3 for a general description of an example structure of a mobile device and how the mobile device operates and communicates with other devices. The mobile device (sometimes referred to alternatively as a "mobile station" or "portable electronic device") may comprise a two-way communication device with advanced data communication capabilities having the capability to communicate with other computer systems and devices. The mobile device may include the capability for voice communications, data communications or a combination of the two. Depending on the functionality provided by the mobile device, it may be referred to as a smartphone, a data messaging device, a two-way pager, a cellular telephone with data messaging capabilities, a wireless Internet appliance, a laptop computer, a tablet computer, a media player (such as an MP3 player), an electronic book reader or a data communication device (with or without telephony capabilities). Although a mobile device is described herein by way of illustration, embodiments described herein may be applicable to other computing devices other than mobile devices. For example, embodiments described herein may be applied to other computing platforms that guard resources with permission access requests in variant implementations.

Referring now to FIG. 1 specifically, a block diagram of a mobile device 100 in one example implementation is shown generally. Mobile device 100 comprises a number of components, the controlling component being microprocessor 102. Microprocessor 102 controls the overall operation of mobile device 100. In some embodiments, certain communication functions, including data and voice communications, are performed through communication subsystem 104. Communication subsystem 104 receives messages from and sends messages to a wireless network 200.

In this example implementation of mobile device 100, communication subsystem 104 may be configured for cellular communication in accordance with the Global System for Mobile Communication (GSM) and General Packet Radio Services (GPRS) standards. The GSM/GPRS wireless network is used worldwide and it is expected that other standards such as Enhanced Data GSM Environment (EDGE) and Universal Mobile Telecommunications Service (UMTS) may be employed. These standards are mentioned as examples only, and other standards may be employed on computing devices to which embodiments described herein are applied.

New standards are still being defined, but it is believed that they will have similarities to the network behavior described herein, and it will also be understood by persons skilled in the art that the described embodiments are intended to use any other suitable standards that are developed in the future. The wireless link connecting communication subsystem 104 with network 200 represents one or more different Radio Frequency (RF) channels, operating according to defined protocols specified for GSM/GPRS communications. With newer network protocols, these channels are capable of supporting both circuit switched voice communications and packet switched data communications.

The wireless network associated with mobile device 100 may comprise a GSM/GPRS wireless network in one example implementation of mobile device 100; however, other wireless networks may also be associated with mobile device 100 in variant implementations. Different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and n-generation (e.g. 2.5G, 3G, 3.5G, 4G, etc.) networks like EDGE, UMTS, High-Speed Downlink Packet Access (HSDPA), High-Speed Uplink Packet Access (HSUPA), High-Speed Packet Access (HSPA), and Long Term Evolution (LTE), etc. Some older examples of data-centric networks include the Mobitex™ Radio Network and the DataTAC™ Radio Network. Examples of older voice-centric data networks include Personal Communication Systems (PCS) networks like GSM and Time Division Multiple Access (TDMA) systems.

Microprocessor 102 also interacts with additional subsystems such as a Random Access Memory (RAM) 106, flash memory 108, display 110, auxiliary input/output (I/O) subsystem 112, serial port 114, keyboard 116, one or more speakers 118, microphone 120, short-range communication subsystem 122 and other device subsystems 124.

Some of the subsystems of mobile device 100 perform communication-related functions, whereas other subsystems may provide "resident" or on-device functions. By way of example, display 110 and keyboard 116 may be used for both communication-related functions, such as entering a text message for transmission over network 200, and device-resident functions such as a calculator, media player or task list. Operating system software used by microprocessor 102 is typically stored in a persistent store such as flash memory 108, which may alternatively be a read-only memory (ROM) or similar storage element (not shown). Those skilled in the art will appreciate that the operating system, specific device applications (illustrated as applications 402 in FIG. 4, below), or parts thereof, may be temporarily loaded into a volatile store such as RAM 106.

In some embodiments, mobile device 100 may send and receive communication signals over network 200 after required network registration or activation procedures have been completed. Network access is associated with a subscriber or user of a mobile device 100. To identify a subscriber, mobile device 100 may require a Subscriber Identity Module or "SIM" card 126 to be inserted in a SIM interface 128 in order to communicate with a network. SIM 126 is one type of a conventional "smart card" used to identify a subscriber of mobile device 100 and to personalize the mobile device 100, among other things. Without SIM 126, mobile device 100 is not fully operational for communication with network 200.

By inserting SIM 126 into SIM interface 128, a subscriber can access all subscribed services. Services could include: web browsing and messaging such as e-mail, voice mail, Short Message Service (SMS), media transfers (such as music downloading or streaming), and Multimedia Messaging Services (MMS). More advanced services may include: point of sale, field service and sales force automation. SIM 126 includes a processor and memory for storing information. Once SIM 126 is inserted in SIM interface 128, it is coupled to microprocessor 102. In order to identify the subscriber, SIM 126 contains some user parameters such as an International Mobile Subscriber Identity (IMSI). An advantage of using SIM 126 is that subscribers are not necessarily bound by any single physical mobile device. SIM 126 may store additional subscriber information for a mobile device as well, including datebook (or calendar) information and recent call information. In certain embodiments SIM 126 may be a different type of user identifier and may be integral to mobile device 100 or not present at all. By way of further examples, a Universal Integrated Circuit Card (UICC), eUICC (Embedded UICC), Removable User Identify Module (R-UIM), CDMA Subscriber Identify Module (CSIM), or Universal Subscriber Identify Module (USIM) may be employed.

Mobile device 100 includes a power pack that supplies power to electronic components and that supports portability. The power pack may be of any type, but for clarity it will be assumed that mobile device 100 is a battery-powered device and includes a battery interface 132 for receiving one or more rechargeable batteries 130. Battery interface 132 is coupled to a regulator (not shown), which assists battery 130 in providing power V+ to mobile device 100. Although current technology makes use of a battery, future technologies such as micro fuel cells may provide the power to mobile device 100.

Microprocessor 102, in addition to its operating system functions, enables execution of software applications on mobile device 100. A set of applications that control basic device operations, including data and voice communication applications, will normally be installed in flash memory 108 (or other non-volatile storage) on mobile device 100 during its manufacture.

Additional applications may also be loaded onto mobile device 100 through network 200, auxiliary I/O subsystem 112, serial port 114, short-range communications subsystem 122, or the other device subsystems 124. This flexibility in application installation increases the functionality of mobile device 100 and may provide enhanced on-device functions, communication-related functions, or both. For example, secure communication applications may enable electronic commerce functions and other such financial transactions to be performed using mobile device 100. Numerous other types of applications may be loaded onto mobile device 100 or other computing devices, including without limitation, messaging applications (e.g. e-mail, text, instant, video, etc.), voice communication applications, calendar applications, address book applications, utility applications, browser application, media player (e.g. audio, video, etc.) applications, social network applications, camera applications, gaming applications, productivity applications, etc.

Serial port 114 enables a subscriber to set preferences through an external device or software application and extends the capabilities of mobile device 100 by providing for information or software downloads to mobile device 100 other than through a wireless communication network. The alternate download path may, for example, be used to load an encryption key onto mobile device 100 through a direct and thus reliable and trusted connection to provide secure device communication.

It should be noted that the term "download" and forms thereof as used herein, in the specification and in the claims, are used generally to describe a transfer of data from one system to another, and is not intended to be limiting with regards to the origin or destination of the transfer, for example. Accordingly, where the term "download" and forms thereof are used in the specification and in the claims, it is intended to encompass other forms of transfers including, for example, an "upload" or a "sideload" of data (e.g. a Universal Serial Bus (USB) sideload).

Short-range communications subsystem 122 provides for wireless device connections to enable communication between mobile device 100 and different systems or devices, without the use of network 200. For example, subsystem 122 may include an infrared device and associated circuits and components for short-range communication. Examples of short range communication would include standards developed by the Infrared Data Association (IrDA), Near Field Communication (NFC), Bluetooth, and the 802.11 family of standards developed by IEEE.

In use, a received signal such as a text message, an e-mail message, or web page download will be processed by communication subsystem 104 and input to microprocessor 102. Microprocessor 102 will then process the received signal for output to display 110 or alternatively to auxiliary I/O subsystem 112. A subscriber may also compose data items, such as e-mail messages, for example, using keyboard 116 in conjunction with display 110 and possibly auxiliary I/O subsystem 112. Auxiliary I/O subsystem 112 may include devices such as: a touch screen, mouse, infrared fingerprint detector, or a roller wheel with a dynamic button pressing capability. Further, auxiliary I/O subsystem 112 may comprise a two-dimensional navigation (or scrolling) component, such as a track ball, a joystick or a directional pad, each optionally with a dynamic button pressing capability. Keyboard 116 is an alphanumeric keyboard and/or telephone-type keypad. A composed item may be transmitted over network 200 through communication subsystem 104.

For voice communications, the overall operation of mobile device 100 is substantially similar, except that the received signals would be output to the one or more speakers 118, and signals for transmission would be generated by microphone 120. Alternative voice or audio I/O subsystems, such as a voice message recording subsystem, may also be implemented on mobile device 100. Although voice or other audio signal output is accomplished primarily through the one or more speakers 118, display 110 may also be used to provide additional information such as the identity of a calling party, duration of a voice call, or other voice call related information. Microphone 120 can receive a supply of power, in the form of a bias voltage and bias current, from the rechargeable battery 130. Different types and configurations of microphone 120 can be incorporated into the mobile device 100.

Referring now to FIG. 2 specifically, a block diagram of the communication subsystem 104 of FIG. 1 is shown. Communication subsystem 104 comprises a receiver 150, a transmitter 152, one or more embedded or internal antenna elements 154, 156, Local Oscillators (LOs) 158, and a processing module such as a Digital Signal Processor (DSP) 160.

The particular design of communication subsystem 104 is dependent upon the network 200 in which mobile device 100 is intended to operate, thus it should be understood that the design illustrated in FIG. 2 serves only as one example. Signals received by antenna 154 through network 200 are input to receiver 150, which may perform such common receiver functions as signal amplification, frequency down conversion, filtering, channel selection, and analog-to-digital (ND) conversion. ND conversion of a received signal allows more complex communication functions such as demodulation and decoding to be performed in DSP 160. In a similar manner, signals to be transmitted are processed, including modulation and encoding, by DSP 160. These DSP-processed signals are input to transmitter 152 for digital-to-analog (D/A) conversion, frequency up conversion, filtering, amplification and transmission over network 200 via antenna 156. DSP 160 not only processes communication signals, but also provides for receiver and transmitter control. For example, the gains applied to communication signals in receiver 150 and transmitter 152 may be adaptively controlled through automatic gain control algorithms implemented in DSP 160.

The wireless link between mobile device 100 and a network 200 may contain one or more different channels, typically different RF channels, and associated protocols used between mobile device 100 and network 200. A RF channel is a limited resource that must be conserved, typically due to limits in overall bandwidth and limited battery power of mobile device 100.

When mobile device 100 is fully operational, transmitter 152 is typically keyed or turned on only when it is sending to network 200 and is otherwise turned off to conserve resources. Similarly, receiver 150 is periodically turned off to conserve power until it is needed to receive signals or information (if at all) during designated time periods.

Referring now to FIG. 3 specifically, a block diagram of a node of a wireless network is shown as 202. In practice, network 200 comprises one or more nodes 202. Mobile device 100 communicates with a node 202 within wireless network 200. In the example implementation of FIG. 3, node 202 is configured in accordance with General Packet Radio Service (GPRS) and Global Systems for Mobile (GSM) technologies. Node 202 includes a base station controller (BSC) 204 with an associated tower station 206, a Packet Control Unit (PCU) 208 added for GPRS support in GSM, a Mobile Switching Center (MSC) 210, a Home Location Register (HLR) 212, a Visitor Location Registry (VLR) 214, a Serving GPRS Support Node (SGSN) 216, a Gateway GPRS Support Node (GGSN) 218, and a Dynamic Host Configuration Protocol (DHCP) 220. This list of components is not meant to be an exhaustive list of the components of every node 202 within a GSM/GPRS network, but rather a list of components that are commonly used in communications through network 200.

In a GSM network, MSC 210 is coupled to BSC 204 and to a landline network, such as a Public Switched Telephone Network (PSTN) 222 to satisfy circuit switched requirements. The connection through PCU 208, SGSN 216 and GGSN 218 to the public or private network (Internet) 224 (also referred to herein generally as a shared network infrastructure) represents the data path for GPRS capable mobile devices. In a GSM network extended with GPRS capabilities, BSC 204 also contains a Packet Control Unit (PCU) 208 that connects to SGSN 216 to control segmentation, radio channel allocation and to satisfy packet switched requirements. To track mobile device location and availability for both circuit switched and packet switched management, HLR 212 is shared between MSC 210 and SGSN 216. Access to VLR 214 is controlled by MSC 210.

Station 206 is a fixed transceiver station. Station 206 and BSC 204 together form the fixed transceiver equipment. The fixed transceiver equipment provides wireless network coverage for a particular coverage area commonly referred to as a "cell". The fixed transceiver equipment transmits communication signals to and receives communication signals from mobile devices within its cell via station 206. The fixed transceiver equipment normally performs such functions as modulation and possibly encoding and/or encryption of signals to be transmitted to the mobile device in accordance with particular, usually predetermined, communication protocols and parameters, under control of its controller. The fixed transceiver equipment similarly demodulates and possibly decodes and decrypts, if necessary, any communication signals received from mobile device 100 within its cell. Communication protocols and parameters may vary between different nodes. For example, one node may employ a different modulation scheme and operate at different frequencies than other nodes.

For all mobile devices 100 registered with a specific network, permanent configuration data such as a user profile is stored in HLR 212. HLR 212 also contains location information for each registered mobile device and can be queried to determine the current location of a mobile device. MSC 210 is responsible for a group of location areas and stores the data of the mobile devices currently in its area of responsibility in VLR 214. Further VLR 214 also contains information on mobile devices that are visiting other networks. The information in VLR 214 includes part of the permanent mobile device data transmitted from HLR 212 to VLR 214 for faster access. By moving additional information from a remote HLR 212 node to VLR 214, the amount of traffic between these nodes can be reduced so that voice and data services can be provided with faster response times and at the same time requiring less use of computing resources.

SGSN 216 and GGSN 218 are elements added for GPRS support; namely packet switched data support, within GSM. SGSN 216 and MSC 210 have similar responsibilities within wireless network 200 by keeping track of the location of each mobile device 100. SGSN 216 also performs security functions and access control for data traffic on network 200. GGSN 218 provides internetworking connections with external packet switched networks and connects to one or more SGSN's 216 via an Internet Protocol (IP) backbone network operated within the network 200. During normal operations, a given mobile device 100 must perform a "GPRS Attach" to acquire an IP address and to access data services. This requirement is not present in circuit switched voice channels as Integrated Services Digital Network (ISDN) addresses are used for routing incoming and outgoing calls. Currently, all GPRS capable networks use private, dynamically assigned IP addresses, thus requiring a DHCP server 220 connected to the GGSN 218. There are many mechanisms for dynamic IP assignment, including using a combination of a Remote Authentication Dial-In User Service (RADIUS) server and DHCP server.

Once the GPRS Attach is complete, a logical connection is established from a mobile device 100, through PCU 208, and SGSN 216 to an Access Point Node (APN) within GGSN 218. The APN represents a logical end of an IP tunnel that can either access direct Internet compatible services or private network connections. The APN also represents a security mechanism for network 200, insofar as each mobile device 100 must be assigned to one or more APNs and mobile devices 100 cannot exchange data without first performing a GPRS Attach to an APN that it has been authorized to use. The APN may be considered to be similar to an Internet domain name such as "myconnection.wireless.com".

Once the GPRS Attach is complete, a tunnel is created and all traffic is exchanged within standard IP packets using any protocol that can be supported in IP packets. This includes tunneling methods such as IP over IP as in the case with some IPSecurity (IPsec) connections used with Virtual Private Networks (VPN). These tunnels are also referred to as Packet Data Protocol (PDP) Contexts and there are a limited number of these available in the network 200. To maximize use of the PDP Contexts, network 200 will run an idle timer for each PDP Context to determine if there is a lack of activity. When a mobile device 100 is not using its PDP Context, the PDP Context can be deallocated and the IP address returned to the IP address pool managed by DHCP server 220.

The public or private network 224 may also provide access to a host system 250.

Figure 4:
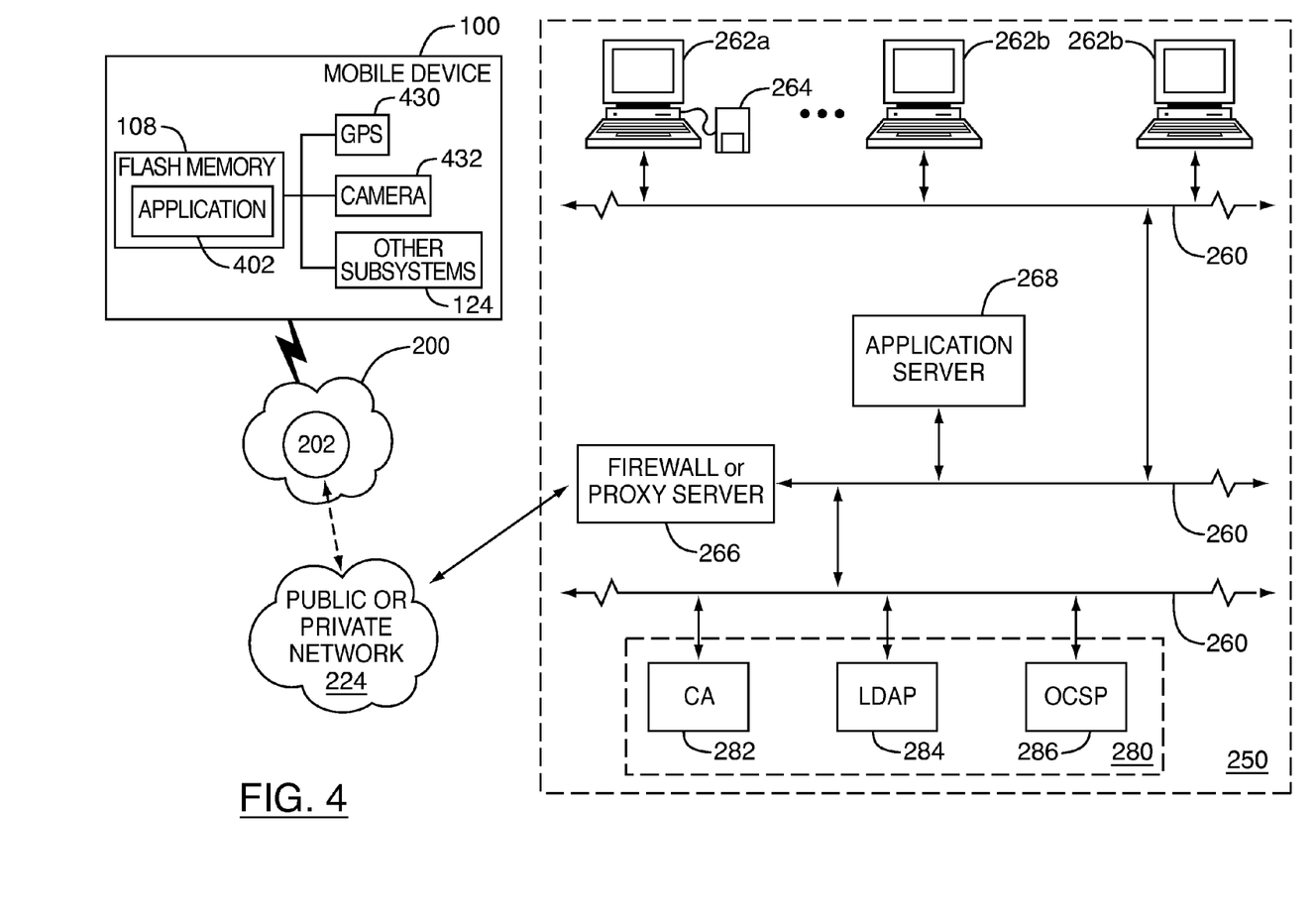
FIG. 4 is a block diagram illustrating components of a host system in one example configuration.

Referring now to FIG. 4, a block diagram illustrating components of a host system in one example configuration is shown. Host system 250 will typically be a corporate office or other local area network (LAN), but may instead be a home office computer or some other private system, for example, in variant implementations. In this example shown in FIG. 4, host system 250 is depicted as a LAN of an organization to which a user of mobile device 100 belongs.

LAN 250 comprises a number of network components connected to each other by LAN connections 260. For instance, a user's desktop computer 262a with an accompanying cradle 264 for the user's mobile device 100 is situated on LAN 250. Cradle 264 for mobile device 100 may be coupled to computer 262a by a serial or a USB connection, for example. Other user computers 262b are also situated on LAN 250, and each may or may not be equipped with an accompanying cradle 264 for a mobile device. Cradle 264 facilitates the loading of information (e.g. PIM data, private symmetric encryption keys to facilitate secure communications between mobile device 100 and LAN 250) from user computer 262a to mobile device 100, and may be particularly useful for bulk information updates often performed in initializing mobile device 100 for use. The information downloaded to mobile device 100 may include certificates used in the exchange of messages. It will be understood by persons skilled in the art that user computers 262*a*, 262*b* will typically be also connected to other peripheral devices not explicitly shown in FIG. 4.

Embodiments described herein relate generally to control of applications (e.g. 402). Accordingly, only a subset of network components of LAN 250 are shown in FIG. 4 for ease of exposition, and it will be understood by persons skilled in the art that LAN 250 will comprise additional components not explicitly shown in FIG. 4, for this example configuration. More generally, LAN 250 may represent a smaller part of a larger network [not shown] of the organization, and may comprise different components and/or be arranged in different topologies than that shown in the example of FIG. 4.

In this example, mobile device 100 communicates with LAN 250 through a node 202 of wireless network 200 and a shared network infrastructure 224 such as a service provider network or the public Internet. Access to LAN 250 may be provided through one or more routers [not shown], and computing devices of LAN 250 may operate from behind a firewall or proxy server 266.

In a variant implementation, LAN 250 comprises a wireless VPN router [not shown] to facilitate data exchange between the LAN 250 and mobile device 100. The concept of a wireless VPN router is new in the wireless industry and implies that a VPN connection can be established directly through a specific wireless network to mobile device 100. The possibility of using a wireless VPN router has only recently been available and could be used when the new Internet Protocol (IP) Version 6 (IPV6) arrives into IP-based wireless networks. This new protocol will provide enough IP addresses to dedicate an IP address to every mobile device, making it possible to push information to a mobile device at any time. An advantage of using a wireless VPN router is that it could be an off-the-shelf VPN component, not requiring a separate wireless gateway and separate wireless infrastructure to be used. A VPN connection would preferably be a Transmission Control Protocol (TCP)/IP or User Datagram Protocol (UDP)/IP connection to deliver the messages directly to mobile device 100 in this variant implementation.

Secure communication protocols rely on public and private encryption keys to provide confidentiality and integrity, and on a Public Key Infrastructure (PKI) to communicate information that provides authentication and authorization. Data encrypted using a private key of a private key/public key pair can only be decrypted using the corresponding public key of the pair, and vice-versa. Private key information is never made public, whereas public key information is shared.

For example, if a sender wishes to send a message to a recipient in encrypted form, the recipient's public key is used to encrypt a message, which can then be decrypted only using the recipient's private key. Alternatively, in some encoding techniques, a one-time session key is generated and used to encrypt the body of a message, typically with a symmetric encryption technique (e.g. Triple DES). The session key is then encrypted using the recipient's public key (e.g. with a public key encryption algorithm such as RSA), which can then be decrypted only using the recipient's private key. The decrypted session key can then be used to decrypt the message body. The message header may be used to specify the particular encryption scheme that must be used to decrypt the message. Other encryption techniques based on public key cryptography may be used in variant implementations. However, in each of these cases, only the recipient's private key may be used to facilitate decryption of the message, and in this way, the confidentiality of messages can be maintained.

As a further example, a sender may sign a message using a digital signature. A digital signature is a digest of the message (e.g. a hash of the message) encrypted using the sender's private key, which can then be appended to the outgoing message. To verify the signature of the message when received, the recipient uses the same technique as the sender (e.g. using the same standard hash algorithm) to obtain a digest of the received message. The recipient also uses the sender's public key to decrypt the digital signature, in order to obtain what should be a matching digest for the received message. If the digests of the received message do not match, this suggests that either the message content was changed during transport and/or the message did not originate from the sender whose public key was used for verification. By verifying a digital signature in this way, authentication of the sender and message integrity can be maintained.

An encoded message may be encrypted, signed, or both encrypted and signed. The authenticity of public keys used in these operations is validated using certificates. A certificate is a digital document issued by a certificate authority (CA). Certificates are used to authenticate the association between users and their public keys, and essentially, provides a level of trust in the authenticity of the users' public keys. Certificates contain information about the certificate holder, with certificate contents typically formatted in accordance with an accepted standard (e.g. X.509).

For a public key to be trusted, its issuing organization must be trusted. The relationship between a trusted CA and a user's public key can be represented by a series of related certificates, also referred to as a certificate chain. The certificate chain can be followed to determine the validity of a certificate.

Certificate servers store information about certificates and lists identifying certificates that have been revoked. These certificate servers can be accessed to obtain certificates and to verify certificate authenticity and revocation status. For example, a Lightweight Directory Access Protocol (LDAP) server may be used to obtain certificates, and an Online Certificate Status Protocol (OCSP) server may be used to verify certificate revocation status.

User computers 262*a*, 262*b* can obtain certificates from a number of sources, for storage on computers 262*a*, 262*b* and/or mobile devices (e.g. mobile device 100). These certificate sources may be private (e.g. dedicated for use within an organization) or public, may reside locally or remotely, and may be accessible from within an organization's private network or through the Internet, for example. In the example shown in FIG. 4, multiple PKI servers 280 associated with the organization reside on LAN 250. PKI servers 280 include a CA server 282 for issuing certificates, an LDAP server 284 used to search for and download certificates (e.g. for individuals within the organization), and an OCSP server 286 used to verify the revocation status of certificates.

Certificates may be retrieved from LDAP server 284 by a user computer 262*a*, for example, to be downloaded to mobile device 100 via cradle 264. However, in a variant implementation, LDAP server 284 may be accessed directly (i.e. "over the air" in this context) by mobile device 100, and mobile device 100 may search for and retrieve individual certificates through a mobile data server 288. Similarly, mobile data server 288 may be adapted to allow mobile device 100 to directly query OCSP server 286 to verify the revocation status of certificates.

In variant implementations, only selected PKI servers 280 may be made accessible to mobile devices (e.g. allowing certificates to be downloaded only from a user's computer 262a, 262b, while allowing the revocation status of certificates to be checked from mobile device 100).

In variant implementations, certain PKI servers 280 may be made accessible only to mobile devices registered to particular users, as specified by an IT administrator, possibly in accordance with an IT policy, for example.

Other sources of certificates [not shown] may include a Windows certificate store, another secure certificate store on or outside LAN 250, and smart cards, for example.

Applications 402 executable on a mobile device 100 may be stored on an application server 268. Application server 268 may have an application database [not shown] that stores applications 402 for download and execution on the mobile device 100. To have access to the applications 402 stored on the application server 268, each user may have a user account managed by the application server 268. Access to the application server 268 may be provided via a client application operating on mobile device 100, although in variant embodiments, access to the application server may be provided through a web browser, for example.

As illustrated, the application server 268 may comprise an internal network server of the host system 250 used to store applications 402 to be deployed to the organization's mobile devices 100. In a variant embodiment, the application server 268 may additionally or alternatively provide an application store or application market that is accessible from the mobile device 100. The application store may allow users of a mobile device 100 to search for, purchase, and download applications 402 to their mobile device 100. In some embodiments, the application server 268 may reside outside of the host system 250, on a remote system accessible via the public or private network 224, for example.

For ease of understanding the described embodiments related to application control, FIG. 4 further illustrates a simplified view of a subset of components of the mobile device 100 described above. The mobile device 100 may run software applications 402 (sometimes referred to simply as "apps") that access computing resources on the mobile device 100. Applications may be stored in the flash memory 108 of the mobile device 100 or other persistent store, and may access computing resources available on the mobile device 100 when executed. Access may be in the form of the applications invoking application programming interfaces (APIs) made available by the OS to access the computing resources, for example.

Computing resources may be associated with a hardware component (e.g., sensors, radios, or peripherals described above) or a software module (e.g., ones that provide access to data or communication buses described above), and may be made accessible to the application 402 via an API provided by the operating system (OS) of the mobile device 100. For example, the mobile device 100 may allow applications to access a GPS subsystem 430 that is capable of determining the physical location of the mobile device 100, or a camera subsystem 432 that is capable of capturing photographs or video. Other accessible resources may include access to software functionality (e.g., encryption services) or data (e.g., phone book entries) available on the mobile device 100, for example.

An installation manifest [not explicitly shown in FIG. 4] that identifies the computing resources that an application 402 may access when the application is executed on mobile device 100, may be associated with the application 402. Accordingly, when a given computing resource is identified in an installation manifest associated with an application, the user can expect that computing resource to be accessed by the application, though not necessarily in every single instance when the application executes. Conversely, when the installation manifest associated with the application fails to identify the computing resource as a resource that the application will access on the computing device when the application is executed, then the application is not expected to access the computing resource.

The installation manifest may be uploaded with the application 402 to the application server 268 from a developer device by the application developer. The installation manifest may be stored with the application 402 on the application server 268, and subsequently provided with an application being downloaded to mobile device 100.

A software or application developer creating the application may include the installation manifest in an application manifest that describes the application 402, which may be specifically formatted for the operating system (OS) that the application 402 is intended to be executed on. For example, the application manifest may be a property list (plist) file for the iOS operating system, or an AndroidManifest.xml file in the Android operating system in some implementations. The application manifest may be stored in an XML format.

Figure 5:
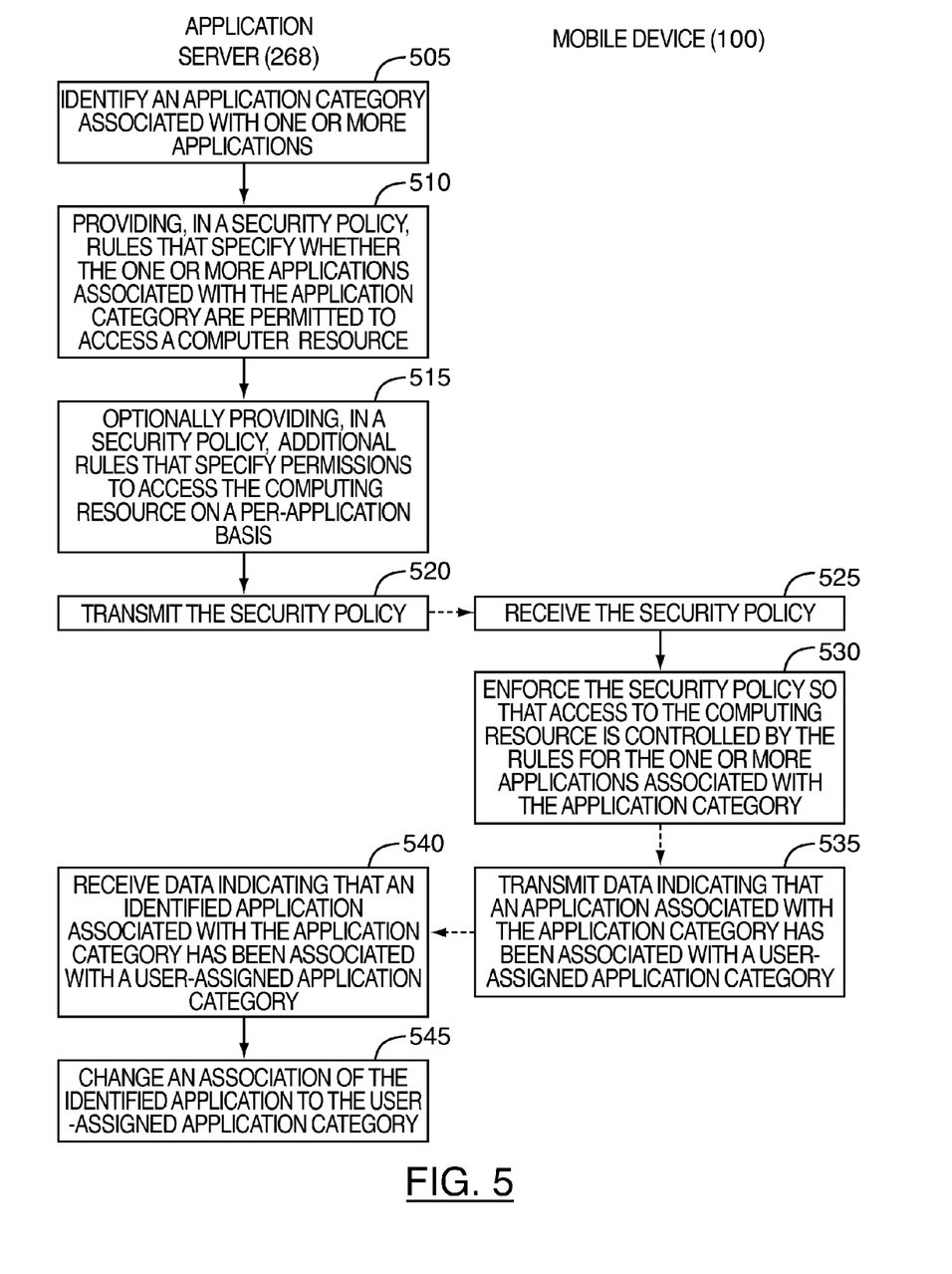
FIG. 5 is a flowchart diagram illustrating the interaction and sequence of events between an application server and a mobile device, in accordance with at least one embodiment.

Referring to FIG. 5, a flowchart diagram illustrating the interaction and sequence of events between an application server and a mobile device, in accordance with at least one embodiment, is shown generally as 500. For convenience, embodiments herein are described in the context of the mobile device 100 shown in FIG. 1.

Figure 6A:
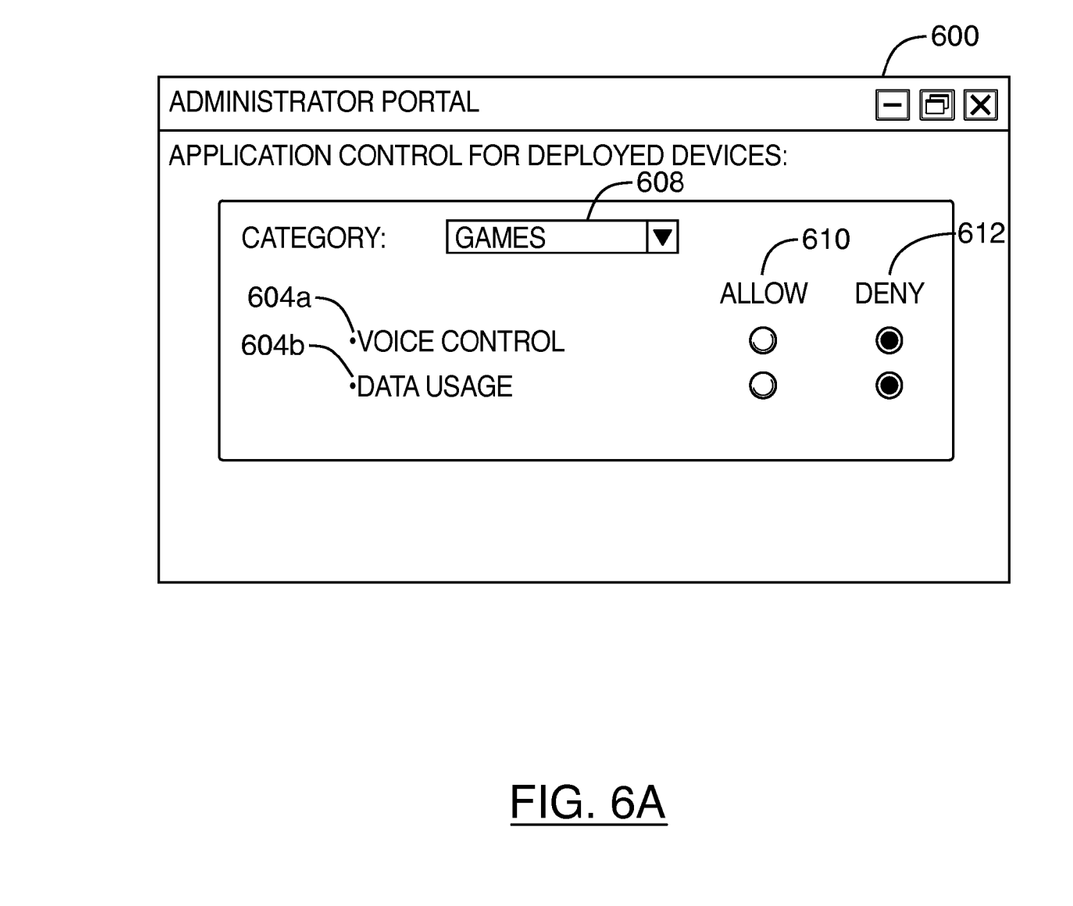
FIG. 6A is an example visual output of a user interface of an administrator portal application displaying options to control computing resources for deployed devices according to an application category.
Figure 6B:
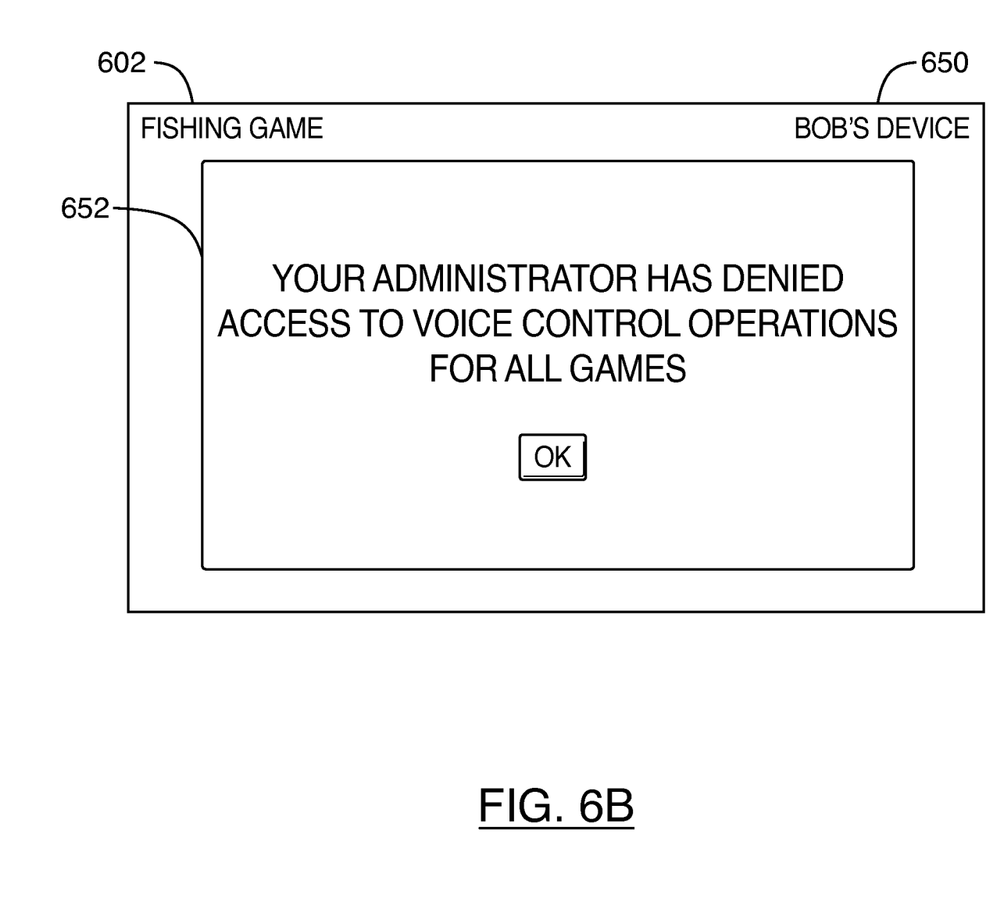
FIG. 6B is an example visual output at a mobile device in which access to a computing resource is denied.

To more clearly illustrate the acts of FIG. 5, an example scenario of controlling applications 402 based on a 'Games' application category will be discussed. Reference will be made to FIGS. 6A and 6B, which show examples of visual output involving this example scenario.

At 505, the application server 268 identifies an application category with which one or more applications 402 executable on the computing device is associated.

In some embodiments, the application category may be an administrator-defined categorization. That is, as a part of the system administrator's duties to keep devices and users safe, the administrator may desire to group applications together so as to be able to administer their security privileges together.

Additionally or alternatively, the application category may be used by the application server 268 as a basis for organizing applications 402 that are available for purchase in an application store. In this case, the applications 402 associated with the application category is determined based on a categorization of the application in the application store. For example, the application store may provide application categories for 'Productivity', 'Games', or 'Leisure', so that users of the mobile device 100 will be able to more easily find applications 402 that perform the functionality that they are seeking.

Relying on the categorization of applications as provided in a given application store may be desirable because it does not require the administrator to identify applications 402 for grouping. When using the categorization of applications 402 in the application store to identify applications 402 as being associated with an application category, applications 402 may be readily assigned to application categories as new applications are added to or deleted from the mobile device. This alleviates the administrator from having to remember to add each newly deployed application to an existing application category, and reduces the likelihood of an application 402 being deployed without security permissions being applied for it.

In the example scenario, an administrator may group a number of applications 402 that provide gaming functionality under the 'Games' application category. Alternatively, applications 402 may automatically be grouped without any action from the administrator by identifying the applications 402 that have been identified in the application store as belonging to the 'Games' application category. In this example, a 'Bob's device' searches for games to download to the device in the application store under the 'Games' application category, and may find a game entitled 'Fishing Game' to download to Bob's device.

Referring again to FIG. 5, at 510, an administrator may provide rules that specify whether the one or more applications 402 associated with a particular application category are permitted to access the computing resource on the computing device. In some embodiments, these rules may be embodied in a security policy. In at least one embodiment, the security policy may be generated at an application server 268, although it may be generated at a different device in variant embodiments. Furthermore, the data of the security policy may be provided in a separate file, for example, or provided with an existing security policy to be transmitted to the mobile device 100.

The rules provided at 402 may specify that all applications belonging to the selected application category are allowed to access all of a number of specified computing resources, or are denied access to all of the specified computing resources. Alternatively, the rules may specify that all applications belonging to the selected application category are allowed access to certain specified resources, but are denied access to other specified resources.

Referring to FIG. 6A, an example visual output of a user interface of an administrator portal application 600 that allows an administrator to provide rules that specify whether applications 402 belonging to an application category are permitted to access the listed computing resources is shown. This administrator portal application may be executed on the application server 268, and operated by an administrator. As illustrated, an option to select the application category 608 for which the rules are being provided may be configured in a user interface for the administrator portal application. A list of computing resources may also be listed, for which an administrator may, for applications belonging to the selected application category, allow 610 or deny 612 access. In the illustrated example, an administrator has selected the 'Games' application category 608, and has indicated that it will deny 612 access to the 'voice control' 604a and 'data usage' 604b computing resources for any applications associated with the 'Games' application category on a mobile device 100.

At 515, optionally, in accordance with a variant embodiment, the application server 268 may also allow the defining of additional rules that specify permissions to access the computing resource on the computing device on a per-application basis. This allows the administrator to retain per-application control of computing resources on the computing devices. These per-application rules may take precedence over the rules provided at 510, which specify whether the one or more applications associated with a specified application category is permitted to access the computing resource on the computing device. The mobile device 100 would then enforce the security policy such that the per-application rules provided at 515 override the application category rules provided at 510. These per-application rules may be provided in the same or a different security policy as the rules providing permissions by application category.

This variant embodiment may provide further flexibility to an administrator, as there may be occasions when the administrator may deem it suitable to override the application category rules in favor of the per-application rules. For example, if a mobile device 100 is deployed in an organization that produces video games, an administrator may wish to generally disallow gaming applications (particularly third-party gaming applications) from accessing the 'data usage' computing resource on the deployed mobile devices, while making an exception for gaming applications that are actually produced by the organization.

In another variant embodiment, the application server 268 may optionally also allow the defining of rules that specify permissions to access the computing resource on the computing device on a per-resource basis. This may allow an administrator to retain per-resource control of computing resources universally across all applications. In this case, the per-category and per-application rules may act as exceptions to the universal per-resource rules. For example, an administrator may initially set a universal per-resource rule to generally disallow access to the GPS computing resource by third-party applications. This may, in turn, be overridden by a per-category rule that allows access to the GPS resource by applications 402 belonging to a 'maps' category. The per-category rule itself may optionally then be overridden (as discussed above) by the per-application rule, as may be the case if the administrator desires to again deny access to the GPS computing resource for a provider of a specific mapping application (e.g., an application from a competitor).

In another variant embodiment, instead of the per-application and per-category rules overriding the per-resource rules, per-resource rules for a specified application may be provided to override the per-application and per-category rules. For example, if a plurality of computing resources are allowed to be accessed by a group of applications 402 on the basis of a per-category rule, and one of those applications 402 is singled out such that it is denied access to the plurality of computing resources for the application category, the mobile device 100 may be configured to override the per-application rule for a particular resource (e.g., re-allowing a particular computing resource that is denied on a per-application basis, but was initially allowed based on the per-category rules). For example, an administrator may allow 'mapping' applications access to the GPS and 'data usage' computing resources, but may in turn, deny access to these resources for a mapping application from a specific vendor who is a competitor. The administrator may then re-allow the 'data usage' computing resource for the competitor application using a per-resource rule to allow operation of the competitor application on a limited basis that does not use the GPS computing resource.

At 520, the application server 268 transmits the security policy to the mobile device 100. The security policy is received by the mobile device 100 at 525. The transmission of the security policy to the mobile device 100 can be performed at various times, or be triggered by various events. For example, the security policy may be 'pushed' to a mobile device when the administrator updates a rule in the security policy or some other setting at the application server 268. Additionally or alternatively, the mobile device 100 may be configured to 'pull' the security policy from an application server 268 whenever a new application 402 is installed at the mobile device 100, or in response to some other triggering event. In a further embodiment, the administrator may provide a security policy to the mobile device 100 before the mobile device 100 is deployed.

At 530, while the security policy is being enforced at the mobile device 100, access to the computing resources on the mobile device 100 is controlled by the rules in the security policy received at 525 that governs the one or more applications associated with the application category. As previously noted, in some embodiments, the rules may be provided such that all computing resources as specified in the security policy are either allowed or denied access by the applications belonging to the application category. In other embodiments, access to some computing resources may be allowed, while access to others are denied.

Access to a given computing resource by other applications on the computing device that are not associated with the application category would not be controlled by the provided rules. A default action may be defined for applications not controlled by per-category rules. For example, applications that attempt to access the given computing resource may initially be denied. Other per-application exceptions or universal settings may still be applicable.

The enforcement of the security policy in the described embodiments thus allows administrators to control access to computing resources on a mobile device on a per-category basis. In particular, administrators may choose to provide permissions for one application category or multiple application categories. For example, if an organization is particularly concerned about one type of applications 402 (e.g., those belonging to the 'Games' application category), they may only provide custom rules that govern how those applications 402 access computing resources.

Referring to FIG. 6B, for the example scenario discussed above, an example visual output 652 of the user Bob's device ('Bob's device' 650) shows that access to the 'voice control' computing resource has been denied when an attempt to access that resource was made by Bob's downloaded application entitled 'Fishing Game' 602, which is associated with the 'Games' application category, during the execution of the application on Bob's device 650. The denial of access triggers the display of the text "Your administrator has denied access to voice control operations for all games", in this example.

While FIG. 6B illustrates the enforcement of a per-category permission when an application 402 is executed, it should be understood that the permission may also be enforced at other times, such as during or after installation of an application 402 but before it is executed.

For example, some mobile devices 100 may be configured to present permission requests for applications 402 in a user interface during the downloading or installing of an application 402. Some mobile devices 100 may further be able to present permission requests when an application 402 is run for the first time (but before the computing resource is actually accessed by the application 402). The per-category permissions may be used to modify the behavior of the mobile device 100 when displaying these permission requests at one or more of these various times, in variant embodiments.

For example, if an application 402 belonging to the 'Games' application category requests permission to access the GPS computing resource (either during the download or installation of the application, or when the application is first executed), and the security policy denies access to the GPS computing resource for applications belonging to the 'Games' application category, then a notification could be displayed to the user indicating that the application 402 cannot access the computing resource due to a security policy. The notification can be displayed, for example, while denying access to the GPS computing resource.

In some scenarios (e.g., when the application server 268 provides an application store), it may be possible that applications are miscategorized. As a result, the security policy for an application category may be incorrectly applied to the application 402. This may cause access to certain computing resources to be erroneously restricted (e.g., allowed or denied) when that application is executed. Acts 535, 540, and 545 address this situation in one variant embodiment, and are optional.

User of mobile device 100 may have assigned a custom application category to the downloaded application, either prior to installation, during installation, or after installation. For example, this may have been done based on input in a user interface provided during the installation of an application 402. The user may have elected to assign the custom application category to the application, which may be different from a default category (e.g. as assigned in an application store) associated with the application. The category assignment may also be determined based on a folder that the user has associated with the application on their mobile device 100. Accordingly, a mobile device 100 may receive data identifying the user-assigned application category as input via the user interface of the computing device or from some other source, identifying an application category that the application 402 is associated with [act not explicitly shown in FIG. 5].

At 535, the mobile device 100 transmits data to the application server 268, that notifies the application server 268 that the application 402 has been associated with a user-assigned application category on the computing device. This data is received by the application server 268 at 540.

At 545, the application server 268 may change an association of the identified application 402 to the user-assigned application category. To help ensure that the newly received user-assigned application category is appropriate, the association of the identified application 402 with the application category may only be changed (i.e., the application 402 be re-categorized) at 540, if the data requesting the change is received by the application server 268 from at least a pre-defined, threshold number of computing devices.

Some of the acts of one or more methods described herein may be provided as software instructions, stored on computer-readable storage media and executable by a processor. Examples of computer-readable storage media may include a hard disk, a floppy disk, an optical disk (e.g. a compact disk, a digital video disk), a flash drive or flash memory, magnetic tape, and memory. Other configurations are possible as well.

In variant implementations, some of the acts of one or more methods described herein may be provided as executable software instructions stored in transmission media.

As used herein, the wording "and/or" is intended to represent an inclusive-or. That is, "X and/or Y" is intended to mean X or Y or both. Moreover, "X, Y, and/or Z" is intended to mean X or Y or Z or any combination thereof.

The present disclosure makes reference to a number of embodiments. However, it will be understood by persons skilled in the art that other variants and modifications may be made without departing from the scope of the embodiments defined in the claims appended hereto.

The invention claimed is:

1. A method of controlling access to a computing resource by applications executable on a computing device, the method comprising:
   identifying an application category, wherein the application category is used as a basis for organizing applications available in an application distribution platform;
   generating a security policy containing one or more rules that specify whether one or more applications, that have been categorized in the application distribution platform as belonging to the application category, are permitted to access the computing resource on the computing device;
   transmitting the security policy to the computing device;
   wherein when an application of the one or more applications is added to the computing device, the added application is automatically assigned to the application category as categorized in the application distribution platform; and wherein when the security policy is enforced at the computing device, access to the computing resource by the added application is controlled by the one or more rules, receiving, from each of a plurality of computing devices, data indicating that an identified application of the one or more applications has been associated with a user-assigned application category on the computing device; and changing an assignment of the identified application to the user-assigned application category, if data indicating that the identified application of the one or more applications has been associated with the user-assigned application category is received from at least a threshold plurality of computing devices.

2. The method of claim 1, wherein access to the computing resource by the added application is allowed or denied, as provided by the one or more rules.

3. The method of claim 1, wherein the generating is performed at an administrator device.

4. The method of claim 1, wherein the identifying, generating, and transmitting are performed by a server device communicatively coupled to the computing device.

5. The method of claim 1, wherein the computing device comprises a mobile device.

6. The method of claim 1, further comprising providing, in the security policy, one or more additional rules that specify permissions to access the computing resource on the computing device on a per-application basis.

7. The method of claim 6, wherein the one or more additional rules that specify permissions to access the computing resource on the computing device on the per-application basis take precedence over the one or more rules that specify whether the one or more applications, that have been categorized in the application distribution platform as belonging to the application category, are permitted to access the computing resource on the computing device.

8. A server device configured to control access to a computing resource by applications executable on a computing device coupled to the server device, wherein the server device comprises a processor configured to:

identify an application category, wherein the application category is used as a basis for organizing applications available in an application distribution platform;

generate a security policy containing one or more rules that specify whether one or more applications, that have been categorized in the application distribution platform as belonging to the application category, are permitted to access the computing resource on the computing device;

transmit the security policy to the computing device;

wherein when an application of the one or more applications is added to the computing device, the added application is automatically assigned to the application category as categorized in the application distribution platform; and wherein when the security policy is enforced at the computing device, access to the computing resource by the added application is controlled by the one or more rules, receive, from each of a plurality of computing devices, data indicating that an identified application of the one or more applications has been associated with a user-assigned application category on the computing device; and change an assignment of the identified application to the user-assigned application category, if data indicating that the identified application of the one or more applications has been associated with the user-assigned application category is received from at least a threshold plurality of computing devices.

9. The server device of claim 8, wherein access to the computing resource by the added application is allowed or denied, as provided by the one or more rules.

10. The server device of claim 8, wherein the server device comprises an administrator device.

11. The server device of claim 8, wherein the computing device comprises a mobile device.

12. The server device of claim 8, wherein the processor is further configured to provide, in the security policy, one or more additional rules that specify permissions to access the computing resource on the computing device on a per-application basis.

13. The server device of claim 12, wherein the one or more additional rules that specify permissions to access the computing resource on the computing device on the per-application basis take precedence over the one or more rules that specify whether the one or more applications, that have been categorized in the application distribution platform as belonging to the application category, are permitted to access the computing resource on the computing device.

14. A non-transitory computer-readable medium comprising instructions which, when executed by a processor of a server device, cause the processor to perform a method of controlling access to a computing resource by applications executable on a computing device, the method comprising:

identifying an application category, wherein the application category is used as a basis for organizing applications available in an application distribution platform;

generating a security policy containing one or more rules that specify whether one or more applications, that have been categorized in the application distribution platform as belonging to the application category, are permitted to access the computing resource on the computing device;

transmitting the security policy to the computing device;

wherein when an application of the one or more applications is added to the computing device, the added application is automatically assigned to the application category as categorized in the application distribution platform; and wherein when the security policy is enforced at the computing device, access to the computing resource by the added application is controlled by the one or more rules, receiving, from each of a plurality of computing devices, data indicating that an identified application of the one or more applications has been associated with a user-assigned application category on the computing device; and changing an assignment of the identified application to the user-assigned application category, if data indicating that the identified application of the one or more applications has been associated with the user-assigned application category is received from at least a threshold plurality of computing devices.

15. The computer-readable medium of claim 14, wherein access to the computing resource by the added application is allowed or denied, as provided by the one or more rules.

16. The computer-readable medium of claim 14, wherein the server device comprises an administrator device.

17. The computer-readable medium of claim 14, wherein the computing device comprises a mobile device.

18. The computer-readable medium of claim 14, wherein the instructions further cause the processor to provide, in the security policy, one or more additional rules that specify permissions to access the computing resource on the computing device on a per-application basis.

19. The computer-readable medium of claim 14, wherein the one or more additional rules that specify permissions to access the computing resource on the computing device on the per-application basis take precedence over the one or more rules that specify whether the one or more applications, that have been categorized in the application distribution platform as belonging to the application category, are permitted to access the computing resource on the computing device.

* * * * *